(12) United States Patent
Powers

(10) Patent No.: US 6,473,029 B1
(45) Date of Patent: Oct. 29, 2002

(54) SYSTEM FOR RECOGNIZING SIGNAL OF INTEREST WITHIN NOISE

(75) Inventor: Kathleen E. Powers, Hanover, MD (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/925,101

(22) Filed: Aug. 8, 2001

(51) Int. Cl.$^7$ ............... G01S 13/00; G01S 3/16; G01S 3/28
(52) U.S. Cl. ............... 342/189; 342/159; 342/378
(58) Field of Search .................. 342/27, 159, 162, 342/189, 195, 378; 375/142, 143, 150, 152

(56) References Cited

U.S. PATENT DOCUMENTS

| | | | | |
|---|---|---|---|---|
| 4,028,699 A | * | 6/1977 | Stevens | 342/108 |
| 4,719,466 A | * | 1/1988 | Farina et al. | 342/159 |
| 4,890,113 A | * | 12/1989 | Jacomini | 342/163 |
| 6,137,433 A | * | 10/2000 | Zavorotny et al. | 342/189 |

* cited by examiner

*Primary Examiner*—Thomas H. Tarcza
*Assistant Examiner*—Brian Andrea
(74) *Attorney, Agent, or Firm*—Antonelli, Terry, Stout & Kraus, LLP

(57) ABSTRACT

A system for detecting a predictable time varying signal within a noisy environment. Rather than merely comparing the output of a matched filter implementation to a threshold, a parallel reference is also generated by autocorrelating the weighting function from the matched filter. The original output and this reference are both acted upon by a mathematical operator and the two then compared for closeness of fit using a Chi-Square Goodness of Fit Test, a Mean Square Error Test, or some other test for closeness of fit. A value indicates the closeness of the two curves and is then compared to a threshold to determine whether the signal of interest is present or not.

21 Claims, 3 Drawing Sheets

SYSTEM FOR RECOGNIZING SIGNAL OF INTEREST WITHIN NOISE

This invention was made with Government support under U.S. Government Contract No. MDA904-00-C-0865 awarded by the Maryland Procurement Office. The Government has certain rights in this invention.

BACKGROUND OF THE INVENTION

1. Field of the Invention

The present invention relates to a system for finding the presence of a predictable signal in a noisy environment. More particularly, the present invention relates to a system for finding a temporally describable known signal in a noisy environment, such as in a radar system.

2. Discussion of the Related Art

One of the most common problems in signal processing is to determine when a signal of interest is present within a noisy environment. Of course, it is impossible to remove all noise. However, as the signal power becomes lower in relation to the noise, i.e., the signal-to-noise power ratio gets smaller, it is more and more difficult to determine if the signal of interest is present or not. A number of different processes have been utilized in order to help locate the presence of such a signal. However, all systems of this type necessarily have limits as to their ability to find a signal when the signal-to-noise ratio becomes small.

One particular area where this is important is in the context of radar. It is known what type of signal should be expected when aircraft are within the range of the radar system. However, it is important to locate the aircraft as soon as possible, even when the signal-to-noise ratio is very low. In modern technology, for example, stealth construction of aircraft effectively lowers the signal-to-noise ratio, so that it is more difficult to detect such aircraft. Also, it is important to detect incoming aircraft even when it is distant and the signal power is low, so that adequate warning time is given, especially if it is an enemy aircraft situation. In other words, detecting the aircraft while it is far away and still has a small signal could be a matter of life or death for defending installations. Whether the situation is in the context of radar or in other situations where a known signal is expected, such as sonar, communications, etc., a signal having a known pattern is expected and knowledge of this time varying pattern makes it possible to locate it even if a great deal of noise is present.

In the past, correlation techniques have been utilized in order to detect signals within a noisy environment. A matched filter implementation has commonly been used in order to help find such a signal. In the case of a time varying signal, the signal is delayed such as in a tapped delay line and samples are taken from the various taps so as to give a picture of the signal as it varies over time. Each of the taps or points on the signal is then multiplied with a vector of weights which in some fashion corresponds to the signal of interest. Thus in a simple fashion, if one expects the signal to have a certain shape, the weights will represent this same shape. These values can then be summed for all the different sampled points to give a correlation output which represents how close the sampled signal comes to a desired signal. If this output exceeds a given threshold it is determined that the signal is present.

This correlation system is very workable and appropriate for radar or other similar systems where a known pattern is being sought. However, such systems have limits, especially where the power of the signal being sought is lower than the noise and interference in which it is found. When it is desired to locate much lower power signals within a noisy environment this system fails.

SUMMARY OF THE INVENTION

Accordingly, the present invention provides a system for locating a signal of interest within a noisy environment.

The present invention further provides a system for locating a signal of interest within a noisy environment using a correlation technique.

The present invention further provides a method for detecting a signal of interest in a noisy environment using a parallel reference method.

The present invention further provides a method and apparatus for detecting a signal of interest in a radar situation using a parallel reference technique.

The present invention further provides a method and apparatus for detecting a signal of interest in a noisy background using a parallel reference technique and a Chi-Square Goodness of Fit test.

The present invention further provides a method and apparatus for detecting a signal of interest in a noisy background using a parallel reference technique and a Mean Square Error test.

This is accomplished in the present invention by providing a parallel reference system for making it easier to see the desired signal. A pattern representing a signal of interest is cross correlated with the incoming signal and is also auto-correlated. The two signals are then subjected to various mathematical operations in a feature generator so as to produce reference and observed signals which are then compared in a Chi Square Goodness of Fit test, a Mean Square Error test, or some other test for closeness of fit. If the observed signal is similar to the reference signal according to this test, a low value is given. This value is compared to a threshold level and a decision is made as to the presence of the signal of interest based on this comparison.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
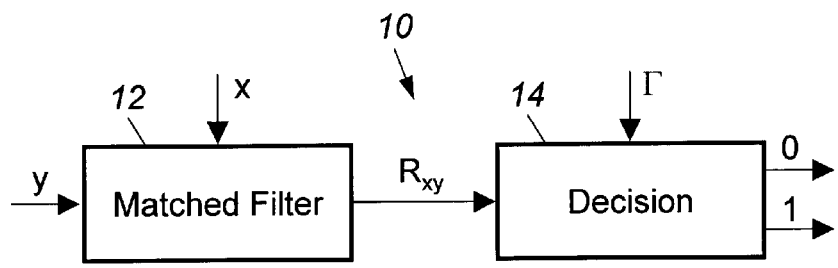
FIG. 1 is a block diagram showing the prior art matched filter system.

Referring now to the drawings, wherein like reference numerals designate identical or corresponding parts throughout the several views and more particularly to FIG. 1 thereof, wherein a prior art system 10 which uses a matched filter is shown as having an input Y. This input signal contains background noise, and perhaps other interfering signals not of interest, and may or may not include the signal of interest. This input forms one of two inputs to matched filter 12 which may be implemented by a cross correlation device. The other input designated X is a representation of the signal of interest which is being sought. These two signals are cross correlated to produce an output $R_{xy}$ which is a cross correlation value. This cross correlation value is used as an input to decision circuit 14. A threshold level Γ is also applied to the decision circuit to establish a threshold level by which the decision is reached. That is, the cross correlation value $R_{xy}$ is compared to this threshold level Γ and if the value is greater than the threshold, the signal of interest is present and an output is given on output 1. If the value is less than the threshold level, the signal is not present and an output is given on output 0. The threshold is placed high enough to eliminate virtually all of the signals which only contain noise, while recognizing most of the inputs containing the signal of interest.

Figure 2:
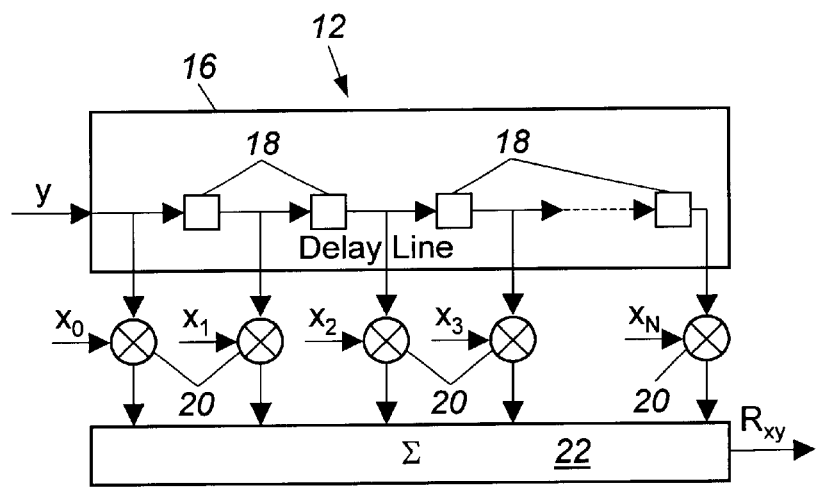
FIG. 2 is a more detailed block diagram of the matched filter implementation shown in FIG. 1.

FIG. 2 shows a more detailed block diagram of the cross correlation device used as a matched filter 12. The filter includes a tapped delay line 16 having a series of delays 18. Before or after each delay, the signal is tapped off so as to give a series of points in the signal separated by time. These signals are correlated to parts of the sample signal x by taking a scalar product of the two. These are summed in summation box 22 and give a sum total of all of the scalar products. This sum is the cross correlation output $R_{xy}$.

Figure 7:
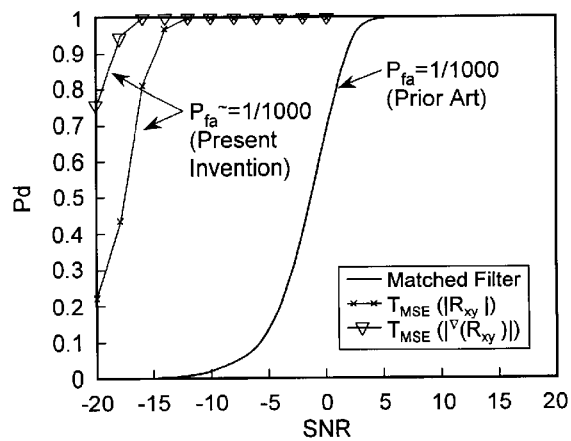
FIG. 7 shows sample performance curves for prior art and the present invention.

Traditionally, these matched filter systems are able to determine with reasonable accuracy the presence or absence of specific signals within a noisy background. However, when the noise power becomes equal to or higher than the signal power, it becomes harder to distinguish the signal of interest from the noise signals. It should be remembered that the signal of interest is present in the input, but prior art techniques are just not able to detect the desired signal sometimes due to the overwhelming noise involved. In the past, some attempts have been made to filter out some of the noise in order to make the signal of interest more visible. However, this has not worked well enough in very low signal-to-noise ratio environments. The present invention is an attempt to detect the signal of interest even when noise is overwhelming to traditional arrangements. For a known deterministic signal in Gaussian noise, the matched filter is considered to be the optimal detector. Due to the statistical properties of the assumed noise, we may calculate the best possible probability of detection for a given false alarm rate that may be achieved using a matched filter. It is shown in FIG. 7 for a Pfa=1/1000 (and integration over 13 pulses).

In both military and commercial applications, it is desirable to have an improved radar system which can detect low power signals in a noisy environment. Especially challenging to collect are low probability of intercept signals such as low power signals, side lobe signals, spread spectrum signals (such as frequency hopping radar) and other wide band signals and signals located in noisy environments or at great distances. Current detection methods such as the matched filter arrangement discussed above are usually not effective when the input signal-to-noise ratio is lower than about 0 dB. The present invention can be used to enhance existing systems to reliably detect low probability of intercept signals and other low power signals and allows traditional and over the horizon radar systems to operate using less power and thus less conspicuously. It can also be used to search wide band receiver data so that it issues an alarm when a high interest signal is detected. Also, geo-location and global positioning could also benefit from this type of invention. The present invention can be used to support these measurements by mitigating the noise effects of atmosphere, weather, power attenuation, antenna point errors, communication through side lobes, etc. This would allow geo-location of transmitters (i.e. marked animals, automobiles, people and other signal sources) in areas that were previously out of range. These systems can also be used for improved intelligence collecting. Traditional spectral analysis fails when the signal-to-noise ratio is too low.

The current system might be used to confirm precise frequencies and/or Doppler shift for pulse signals with unknown frequency components. The present invention is able to detect signals with a much lower signal-to-noise ratio than prior art devices. This is because the cross correlated (observed) signal is first subjected to further mathematical functions and then compared to an autocorrelation (reference) signal rather than merely comparing it to a threshold value. A comparison test between the reference signal and the observed correlated signal determines the degree of fit between the two signals. It is this value which is then compared to a threshold level. It has been found that this additional processing enhances the ability for the system to detect low signal-to-noise ratio signals, even those which are approximately 15 dB less than those detected in prior art systems.

Figure 3:
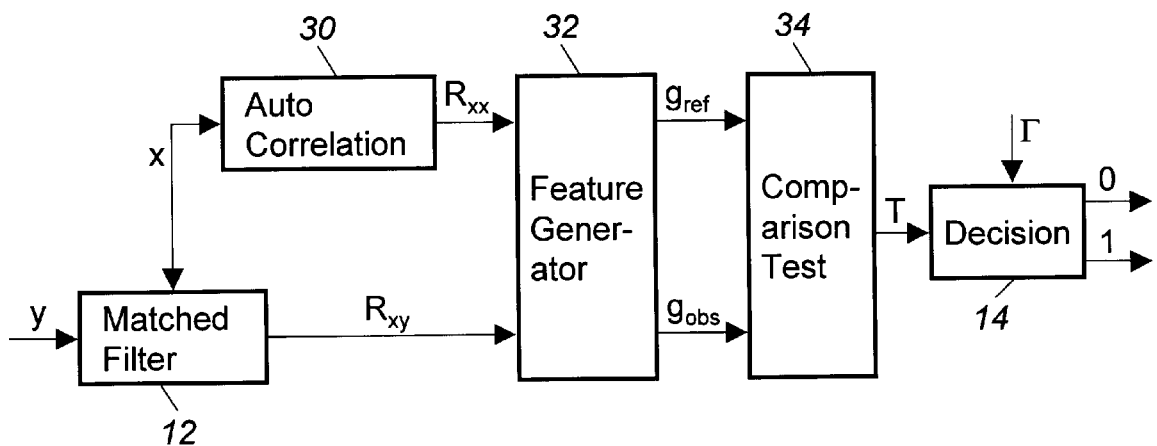
FIG. 3 is a block diagram of the parallel reference system according to the present invention.

FIG. 3 shows the system according to the present invention, which may be referred to as a parallel reference system. In this case, the Y input, which includes noise and may or may not include the signal of interest, is applied to cross correlation device 12, which is an implementation of a matched filter as shown in FIG. 1. A representation of the signal of interest X is also applied to the cross correlation device in the same manner. The result of the correlation is a value $R_{xy}$, which gives a numerical indication of the closeness of the two signals. However, in this system, an autocorrelation device 30 is also provided to which the same signal of interest X is applied. This system is very similar to matched filter 12 except that the signal input X is correlated in the same fashion, but with itself. The resultant output is a value $R_{xx}$. These two values $R_{xx}$ and $R_{xy}$ are then both applied to a feature generator 32 which performs some type of mathematical operation on both signals. The need for this mathematical operator will be more apparent after further discussion, but the operation may be merely an absolute value function or may be a gradient function. The gradient function provides a measure of the slope of the signal applied. Suffice it to say for the moment that this mathematical operation is customized to maximize the effectiveness of the comparison test 34. After the mathematical operation is applied to the signals, generated signals $g_{ref}$ and $g_{obs}$ are applied to the comparison test apparatus 34.

It should be remembered at this point that the two inputs to the comparison test are time varying signals with one being based on the input signal and the other being based on the reference desired signal. The purpose of the comparison test is merely to compare these two signals using known test functions to determine their closeness. That is, these known comparison tests are often used to measure how a series of data points approximates a specific probability density to see if that probability density can be used to approximate the data points. Two well known tests that are used for this function are the Chi-Square Goodness of Fit test and the Mean Square Error test. The Chi-Square test is given as $$T = \chi^2(g_{ref}, g_{obs}) = \sum_{n=1}^{N} \left[ \frac{(g_{obs}[n] - g_{ref}[n])^2}{g_{ref}[n]} \right]$$

Thus for every point n on the two curves, a difference is generated between the two values. The difference is squared and divided by the reference value to weight the squared difference.

The Mean Square Error test is similar and is defined as $$T = MSE(g_{ref}, g_{obs}) = \frac{1}{N} \sum_{n=1}^{N} (g_{obs}[n] - g_{ref}[n])^2$$

In this case, rather than dividing each squared difference by individual reference point values, the sum is normalized by N, the number of values summed. However, both tests relate to the squared difference between the observed data and the reference data at points in the two curves. As can be easily seen, the more different the two curves are, the greater the value for T. On the other hand, if the two values are very close together at all points, the squares of the differences will be very small and the value of T will be very small as well. Thus, the output T indicates the difference between the two curves and this then becomes the input to decision-maker 14 to decide between an output indicating that the signal is present or an output indicating that the signal is not present. In this case, however, the threshold value Γ acts in the opposite direction, that is, it gives a signal present output if the value of T is less than Γ as opposed to being greater than Γ in the device of FIG. 1. That is because a small T indicates that the two curves are close together.

Returning now to the mathematical functions that are present in the feature generator 32, as stated before, these mathematical operators are chosen so as to maximize the effectiveness of the comparison test. One manipulation which is desirable is to remove any possibility that one of the reference values can be 0 or a very small number. This is because in the Chi-Square test, this value is used as the denominator in a fraction. If $g_{ref}$ is very small or 0, the fraction becomes large and probably would skew the results. Accordingly, it is necessary to ascertain that $g_{ref}$ is not a very small number. Some commentators on this kind of test suggest that the value should be at least 5. Along with this, it is desirable to make sure that all values of $g_{obs}$ and $g_{ref}$ are on the positive side. Since the differences between the two signals are squared in the comparison test, it is not critical that all values be positive to avoid a negative result, since these are removed in the squaring process. However, utilization of absolute values simplifies the analysis.

Thus, the feature generator 32 uses mathematical operators to generate outputs which can be compared more effectively in the comparison test. Two operators that seem to be helpful are the absolute value of the correlation functions and the gradient of the correlation functions. The gradient provides a measure of the slope of the correlation functions. While these functions are not the only possible functions, they have been found to be useful and to make the chosen comparisons more accurate. Other functions may also be used if they are found empirically to improve the comparison.

In the case of a radar environment it is particularly useful to utilize a square wave as the X signal or signal of interest. When a square wave is autocorrelated, a triangular wave is the result. Thus, $R_{xx}$ will be a triangular shape. If the signal of interest is present, the reference signal $R_{xy}$ will also approach a triangular wave shape. If this triangular waveshape is then applied to the feature generator 32 and the operator being used is the gradient function, the reference gradient function will be flat for each smooth, constant slope of the triangular function. The gradient of the observed function will also be similarly flat although with an amount of noise corresponding to the input. Similarly, if the operator is the absolute value function, the reference signal will remain triangular and the observed signal will approach this type of signal.

When the two signals are applied to the comparison test, the generated signals based on the mathematical operator applied to the reference signal and the observed signal are compared using the Chi-Square, Mean Square Error, or other test for measure of closeness. The resultant output T is a measure of how close these two signals are. If the output, T, is low enough, it is assumed that the desired signal is contained in the input noisy signal.

While the various parts of the present invention have been described in terms of discrete components, this is not the only form in which the invention may be presented. Thus, the individual components may actually be part of an integrated circuit or even parts of a microprocessor designed to perform these mathematical calculations. It would also be possible to use a programmed general purpose computer microprocessor, or field programmable gate array integrated circuit(s) for these possibilities since the various functions are basically mathematical in nature.

Figure 4A:
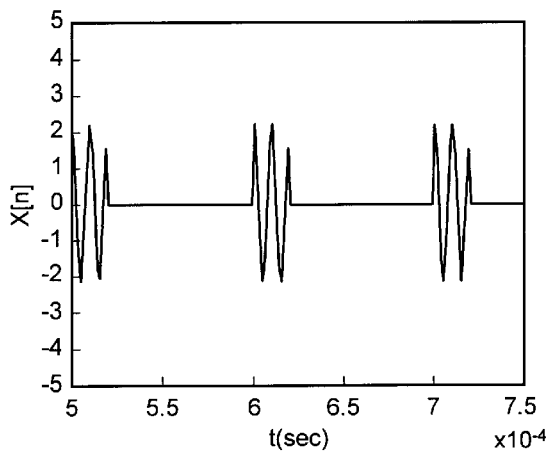
FIGS. 4A–4C are graphs showing an example of a the signal of interest, the output of the matched filter when the signal is present, and when the signal is absent.
Figure 4B:
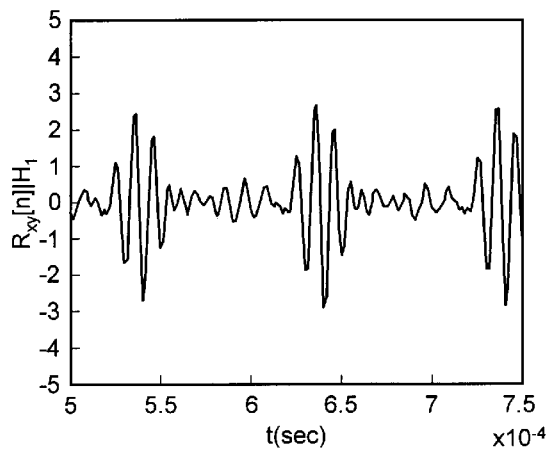
Figure 4C:
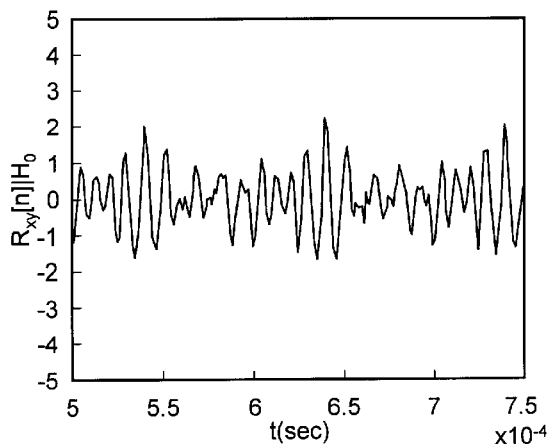

FIGS. 4A–4C are graphs showing three signals related to the prior art system. In FIG. 4A, the signal x which represents an example of the signal of interest is shown, where the signal-to-noise ratio is −10 dB; pulse repetition interval, pulse duration and carrier frequency are constant; and the correlation operations are integrating approximately 13 pulses of input signal. FIG. 4B shows the cross correlation output $R_{xy}$ of the system when this signal of interest is present within the noise. FIG. 4C shows the same signal as FIG. 4B, but where the signal is not present. In systems such as this, the prior art device is able to detect the signal, as long as the signal-to-noise ratio is high enough. When the signal-to-noise ratio decreases, it is very difficult to recognize the signal within the noise variations.

Figure 5A:
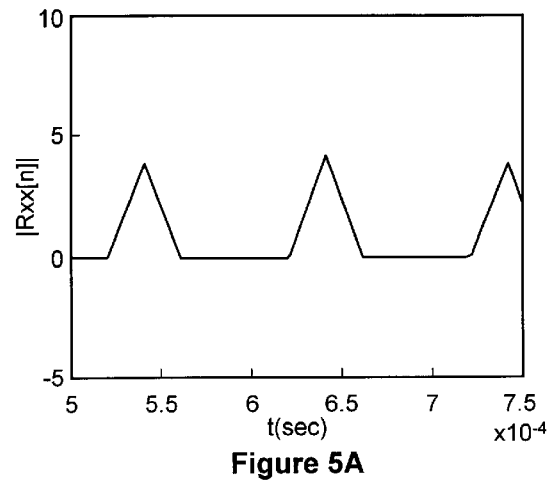
FIGS. 5A–5C are graphs showing the reference output of the feature generator, the observed output of the feature generator when the signal is present and the observed output when the signal is not present.
Figure 5B:
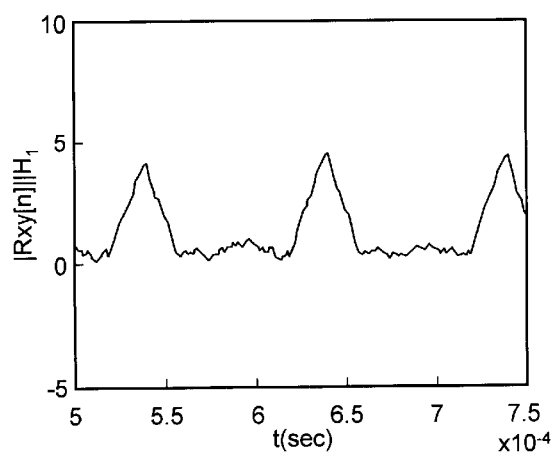
Figure 5C:
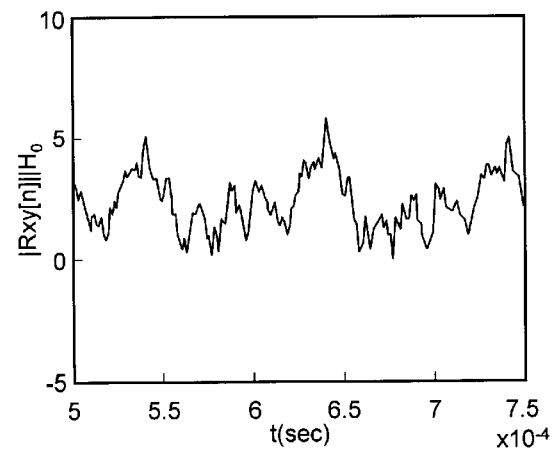

FIGS. 5A–5C show examples of signals in relation to the present invention shown in FIG. 3. FIG. 5A represents the output $g_{ref}$ of the function generator 32 based on the autocorrelation signal. In this case, the mathematical operator is merely the absolute value function. Accordingly, FIG. 5A shows a triangular shaped wave because the output of the autocorrelator of a square wave is a triangular wave. In FIG. 5B, the output $g_{obs}$ is the generated signal where the signal of interest is present within the noise. In FIG. 5C, this signal is not present.

Figure 6A:
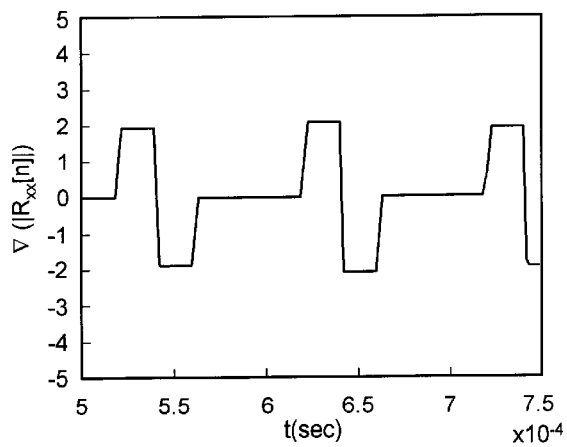
FIGS. 6A–6C are graphs having output similar to those in FIGS. 5A–C but using a different function.
Figure 6B:
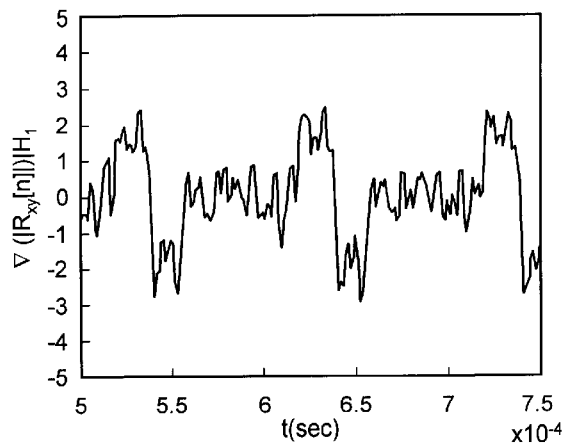
Figure 6C:
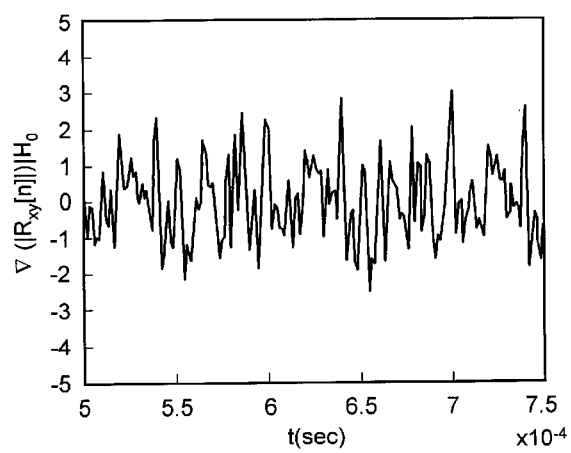

Likewise, FIGS. 6A–6C exhibit similar conditions. In FIG. 6A, the $g_{ref}$ from the feature generator is shown where the mathematical operator is the gradient function and the input is the triangular wave as above. In FIG. 6B, the signal is present and in FIG. 6C the signal is not present.

Thus, as examples, the $g_{ref}$ in FIGS. 5A or 6A are used in the comparison test 34 to be compared with $g_{obs}$ as seen in FIGS. 5B, and 5C,or 6B and 6C. The comparison tests between the A curve and either the B or C curves yields a value which depends on differences between individual points on the curve and specifically as squares of these differences. As can easily be seen by eye, the B figure of each set is closer to the A figure than the C figure is. This means that the differences between the A and B curves will be considerably less than the differences between the A and C curves. After squaring and summing, the end result is that the value of T is much smaller for the B curve than for the C curve.

FIG. 7 gives a theoretical performance curve for the prior art (matched filter) and empirically determined curves for two different variations of the present invention. This graph shows the probability of detection of a signal as the vertical axis and the signal-to-noise ratio as the horizontal axis. Thus, the curve to the right indicates the ability of the prior art device to determine the presence of a signal at varying signal-to-noise ratios. As can be seen, at less than the 0 dB level of the signal-to-noise ratio, the reliability of this system drops drastically. On the other hand, as shown by the two curves indicating the use of the present invention, one with the gradient function in the function generator and the other using the absolute value only, high reliability is present even at signal-to-noise ratios of −15 dB. This indicates a drastic improvement in the ability to detect low level signals within a noisy environment, specifically in an Additive White Gaussian noise environment, i.e., where the noise is present across the spectrum and distributed according to a Gaussian function (like a bell-shaped curve). The parallel reference method does not require a priori knowledge of the pulse start time or the phase of the carrier in order to perform as shown in FIG. 7. By modifying the design slightly, the parallel reference method may handle complex input data as well as real data.

Numerous additional modifications and variations of the present invention are possible in light of the above teachings. It is therefore to be understood that within the scope of the appended claims, the invention will be practiced otherwise than as specifically described herein.

What is claimed is:

1. An apparatus for detecting the presence of a signal of interest within a noisy input comprising:
    a matched filter for receiving said input and generating an output;
    an autocorrelation device for autocorrelating a function which is also applied to said matched filter as a weighting function, said autocorrelation device producing an output;
    a feature generator for performing a mathematical operation on the output of said matched filter and the output of said autocorrelation device and then producing two outputs;
    a comparison test device for receiving two outputs from said feature generator and performing a closeness of fit test to determine how close the two outputs are to each other and producing a comparison output indicating this closeness; and
    a decision circuit for comparing said comparison output to a threshold to determine whether the input signal is present or not.

2. The apparatus according to claim 1, wherein the comparison test is a Mean Square Error Test.

3. The apparatus according to claim 1, wherein the mathematical operator is the gradient of the correlation.

4. The apparatus according to claim 1, wherein the mathematical operator is the gradient of the correlation plus a constant value.

5. The apparatus according to claim 1, wherein the mathematical operator is the absolute value of the correlation function.

6. The apparatus according to claim 1, wherein the mathematical operator is the absolute value of the correlation function plus a constant value.

7. The apparatus according to claim 1, wherein the weighting function is a square wave and the output of the autocorrelation device is a triangular wave.

8. The apparatus according to claim 1, wherein the input signal is an output from a radar system.

9. The apparatus according to claim 1, wherein the matched filter is a cross correlation device.

10. A method for detecting the presence of the signal of interest in a noisy input comprising:
    performing a cross correlation between said input and a weighting function to produce a cross correlation output;
    performing an autocorrelation on said weighting function to form an auto-correlation output;
    performing a mathematical operation on said cross correlation output and said autocorrelation output to generate an observed generated signal and a reference generated signal;
    comparing said observed generated signal and said reference generated signal using a comparison test to determine how close the two signals are to each other and to generate a comparison output; and
    comparing said comparison output to a threshold to determine the presence of the signal of interest in the input signal.

11. The method according to claim 10, wherein the comparison test is a Mean Square Error Test.

12. The method according to claim 10, wherein the mathematical operator is the gradient of the correlation.

13. The method according to claim 10, wherein the mathematical operator is the gradient of the correlation plus a constant value.

14. The method according to claim 10, wherein the mathematical operator is the absolute value of the correlation function.

15. The method according to claim 10, wherein the mathematical operator is the absolute value of the correlation function plus a constant value.

16. The method according to claim 10, wherein the input is an output from a radar system.

17. The method according to claim 10, wherein the weighting function is a square wave and the autocorrelation output is a triangular wave.

18. An apparatus for detecting a signal of interest within a noisy input comprising:
    a matched filter for correlating said input with a weighting function;
    an autocorrelation device for autocorrelating said weighting function to produce an output;
    a comparison test device for comparing the output of said autocorrelation with the output of said matched filter to determine the closeness of the two outputs and for producing a value indicative of this closeness; and
    a decision device for comparing said comparison output with a threshold to determine whether said signal of interest is present in said input.

19. A method of determining the presence of a signal of interest in a noisy input comprising:
    performing a cross correlation between said input and a weighting function to produce an output;
    performing an autocorrelation of said weighting function to produce an output;
    performing a comparison test between the output of said autocorrelation step with the output of said cross correlation step to determine the closeness of the two outputs and for generating a comparison output indicative of this closeness; and comparing said comparison output with a threshold to determine the presence of said signal of interest in said input.

20. A computer program embodied on a computer readable medium and executable by a computer to determine the presence of a signal of interest in a noisy input, comprising:

performing a cross correlation between said input and a weighting function to produce an output;

performing an autocorrelation on said weighting function to produce an output;

comparing the output of said autocorrelation step with the output of said correlation step to determine their closeness and to generate a comparison output indicative of this closeness; and comparing said comparison output to a threshold to determine the presence of said signal of interest in said input.

21. The computer program according to claim 20, further comprising a feature generator for performing a mathematical operation on the output of said cross correlation and the output of said autocorrelation before said comparing step.

* * * * *